No. 818,264. PATENTED APR. 17, 1906.
G. KLUMPP.
FILTER.
APPLICATION FILED OCT. 24, 1904.
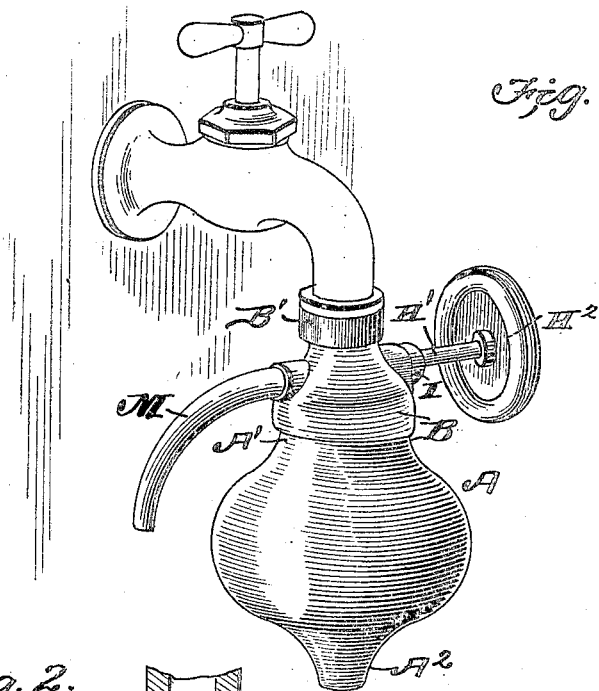
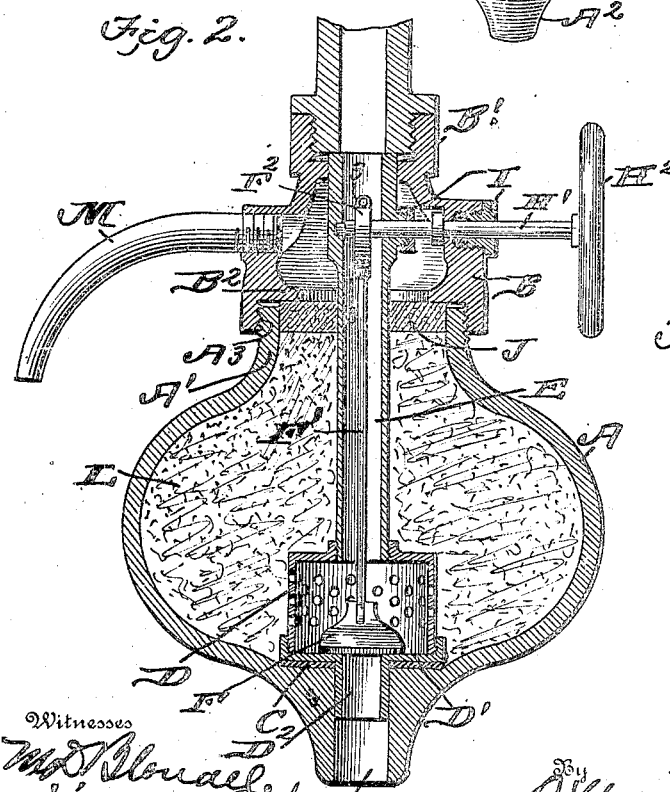
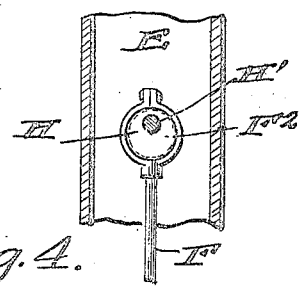
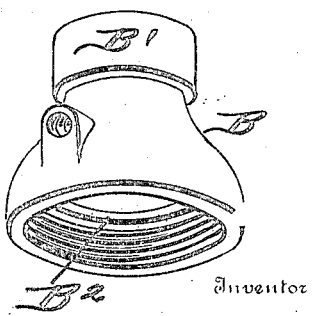
Witnesses
Inventor
G. Klumpp

UNITED STATES PATENT OFFICE.

GOTTLOB KLUMPP, OF BROOKLYN, NEW YORK.

FILTER.

No. 818,264. Specification of Letters Patent. Patented April 17, 1906.

Application filed October 24, 1904. Serial No. 229,801

*To all whom it may concern:*

Be it known that I, GOTTLOB KLUMPP, a subject of the German Emperor, residing at Brooklyn, in the county of Kings and State of New York, have invented a new and useful Improvement in Filters, of which the following is a specification.

This invention relates to an improvement in filters, and has for its object to provide a cheap and simple device that may be readily attached to the ordinary form of spigot and which may be adjusted to discharge the water direct from the main or operated to deflect the course of the water and cause it to flow through a filtering medium and out through a supplemental pipe connected to a cap arranged upon the casing that holds the filtering medium and by which the casing is connected to the spigot.

Another object of my invention is to provide a device in which a powdered or granulated filtering material may be used, and still a further object is to provide an arrangement by which the filtering material may be thoroughly and compactly pressed together to insure a perfect filtration of the water.

With these objects in view my invention comprises a casing in which is arranged the filtering material, a cap connected to the casing, a divisional plate or disk arranged between the cap and casing and which is forced down upon the filtering material to pack it within the casing when the cap is screwed in position, and the invention also comprises means by which the flow of water is directed through the casing or deflected to pass through the filtering material and out through the pipe connected to the cap.

My invention also comprises certain details of construction and peculiar combination and arrangement of parts, as will be fully described in the following specification and pointed out in the claims, reference being had to the drawings, in which—

Figure 1 is a perspective view showing the practical application of my invention. Fig. 2 is a vertical sectional view of the same. Fig. 3 is a detail section drawn on the line 3 3 of Fig. 2, and Fig. 4 is a detail view in perspective of the cap to which the casing is connected and by which the device as a whole is connected to the spigot.

In carrying out my invention I employ a casing A, which may be made of glass, porcelain, or any other suitable material and design. The casing A has a straight neck portion A', formed at its upper end and a discharge tube or mouth $A^2$ at its lower end, the end forming the neck being threaded exteriorly, as at $A^3$, to which is screwed the lower end of a cap B, whose upper end also terminates in a threaded neck B', by which the cap is connected to the spigot.

Arranged within the casing and resting on a packing-ring or washer C, arranged therein, is a short perforated cylinder D, having a detachable head D', which is provided with a tube $D^2$, that extends into the discharge-mouth of the casing, and connected to the upper end of the cylinder is a tube E, which extends entirely through the casing, up through the cap, and into the threaded neck thereof, so that it may be engaged by the threaded nipple of the spigot when the cap is screwed upon the spigot and by which the perforated cylinder is firmly and securely pressed against the casing and which prevents the escape of the filtered water at this point.

Arranged within the perforated cylinder to close the opening formed by the tube $D^2$ is a valve F, having a washer or suitable packing upon its lower face which engages the removable head of the cylinder, and connected to the valve is a rod F', which extends up into the tube and is connected at its upper end to an eccentric-band $F^2$, mounted upon an eccentric H, carried by a shaft H', which projects through the cap and tube and has a hand-wheel $H^2$, arranged upon its outer end. Suitable stuffing-boxes I are employed to prevent leakage around the shaft where it passes through the tube and cap.

Arranged within the neck of the casing is a divisional plate or disk J, which may be perforated or of a porous substance to permit the escape of the water into the cap after it passes through the filtering material. This disk J is designed to press upon the filtering material to thoroughly compact the same and is forced down into the casing by means of a flange $B^2$, formed in the cap, and it will be readily understood that after the filtering material L is put in the casing and the disk arranged in the mouth of the casing the filtering material will be firmly compressed when the casing is screwed into the cap, and by compressing this material it becomes practically a solid mass which thoroughly cleanses the water as it percolates therethrough. A discharge-tube M is connected to the cap through which the filtered water escapes as it comes up through the disk.

In operation, assuming that the filter is arranged upon a spigot and it is desired to draw a quantity of filtered water, the hand-wheel is turned, which, through the medium of the shaft, eccentric, and rod, forces the valve down against the bottom of the perforated cylinder and closes the mouth of the tube. The direct course of the water being cut off, it escapes through the perforated cylinder, up through the filtering material, through the perforated or porous disk into the cap, and finally out through the pipe M. When the necessary quantity of filtered water has been obtained, the valve of the spigot is closed and the water will be cut off. Now should it be desired to obtain a quantity of unfiltered water the hand-wheel is reversed, the eccentric will be operated which elevates the valve and permits the water to flow direct from the spigot through the tube E, perforated cylinder, tube $D^2$, and finally through the mouth $A^2$ of the casing.

It will thus be seen that the operation of adjusting the device upon a spigot and also of operating the device to draw filtered or unfiltered water is exceedingly simple, and when the filtering material has been used for a time and becomes impregnated with the sediment from the water it may be easily removed and a fresh supply substituted, and, further, that the cylinder is designed to collect the larger and coarser particles of sediment in the water before it passes into the filtering material, and that the larger particles are washed out when the course of the water is directed straight through the tubes.

Having thus fully described my invention, what I claim as new, and desire to secure by Letters Patent, is—

1. In a filter, the combination with a casing designed to contain a filtering material, said casing having a neck at its upper, and a discharge-opening at its lower end, of a cap connected to the neck, a perforated cylinder arranged in the casing and having a tube extending into the discharge-opening and a tube projecting from the top which extends into the casing, a disk arranged in the neck of the casing and means carried by the cap and tube for closing the tube connected to the lower end of the cylinder for the purpose specified.

2. In a filter, the combination with a casing adapted to contain a filtering material and having a discharge-mouth at its lower end and a neck at its upper end, of a cap connected to the neck, said cap having a threaded neck portion at its upper end and a flange at its lower end, a perforated cylinder arranged within the casing, said cylinder having a tube attached to its lower end and communicating therewith, and a tube attached to its upper end, and also communicating therewith, the last-named tube extending up through the cylinder and cap, a shaft journaled in the cap and projecting into the tube, and having an eccentric upon its inner end, a band surrounding the eccentric, a rod depending from the band, a valve connected to the rod and a discharge-tube connected to the cap.

3. The combination with a casing designed to contain a filtering material, and having a discharge-opening and a neck portion, of a cap connected to the neck portion, said cap having a threaded neck designed to engage a water-spigot, a tube connected to the cap, a flange formed integral with the cap, a perforated cylinder arranged within the casing, said cylinder having tubes connected to and communicating therewith, one of the tubes projecting into the cap and engaging the spigot, a shaft journaled in the cap and an eccentric arranged on the shaft, a band carried by the eccentric, and having a rod connected thereto, a valve connected to the lower end of the rod, and a porous disk disposed in the casing and adapted to engage the flange and filtering material to compress the latter when the casing and cap are connected substantially as specified.

GOTTLOB KLUMPP.

Witnesses:
  M. D. BLONDEL,
  E. M. VENN.